(No Model.)

J. LUCAS.
FEED REGULATOR.

No. 296,024.  Patented Apr. 1, 1884.

Witnesses,
D. T. Chamberlain
W. C. Cooper

Inventor,
John Lucas
R. S. & A. Lacey
Attorneys

UNITED STATES PATENT OFFICE.

JOHN LUCAS, OF HASTINGS, MINNESOTA.

FEED-REGULATOR.

SPECIFICATION forming part of Letters Patent No. 296,024, dated April 1, 1884.

Application filed June 23, 1883. (No model.)

*To all whom it may concern:*

Be it known that I, JOHN LUCAS, a citizen of the United States, residing at Hastings, in the county of Dakota and State of Minnesota, have made certain new and useful Improvements in Feed-Regulators, of which the following is a specification.

This invention relates to improvements in feed-regulators, and has for its object a device for regulating the flow of grain or other substances passing onto a separator to be separated or cleaned—such as is used in cockle-machines, bran-machines, wheat and oat separators, &c.

It consists in the novel combination and relative arrangement of the several parts, as will be hereinafter fully described, and pointed out in the claims.

Figure 1:
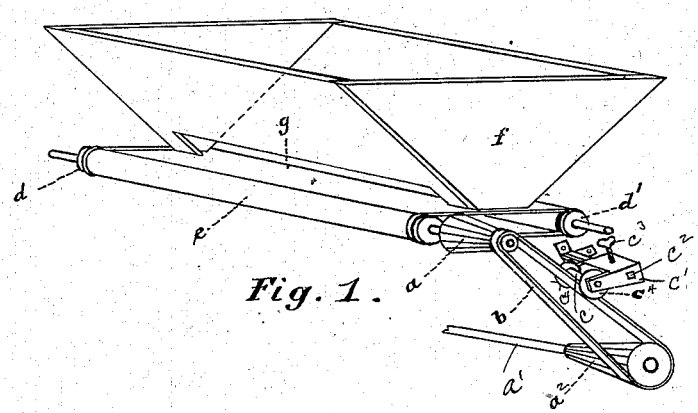
Figures 2, 3:
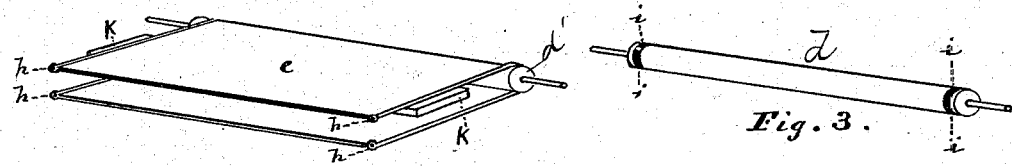
Figure 4:
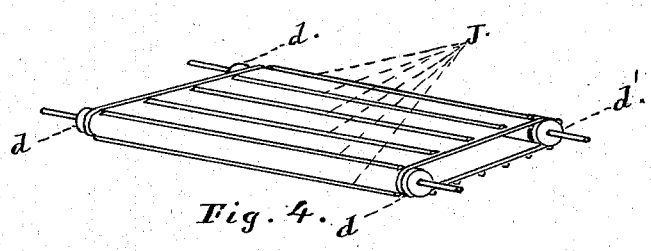

In the drawings, Figure 1 is a perspective view of my improved feed mechanism. Fig. 2 is a detail view of the apron having its ends detached, and showing the supporting-board. Fig. 3 shows one of the apron-rollers in detail, and Fig. 4 shows a preferred form of the apron, all of which will be described.

The hopper $f$ is made flaring from its upper end, and its bottom is open, and it is provided in its forward side with the grain-discharge opening $g$, cut up from its open bottom, all of which is clearly shown in Fig. 1.

Rollers $d\ d'$ are suitably journaled in the framing of the device, and are arranged one in advance of and the other to the rear of the hopper, and parallel with the longest portion of said hopper, as shown. These rollers are arranged with their upper sides in line or flush with the lower side of the hopper $f$, and they are provided close to their opposite ends with the circumferential grooves $i\ i$, to receive the thickened outer edges of the apron, presently described.

The apron $e$ is preferably constructed with its edges hemmed over a cord or belt, in order to provide the thickened edge portion $h$, as shown, which portion runs in the grooves $i\ i$, and serves the purpose of holding the apron stretched, and as a means of preventing the grain dropping over the sides of same, as will be readily understood. This apron is shown in Fig. 2 with its ends detached, in order to better illustrate the thickened edge portions $h$. In practice the ends are secured together, and the apron is placed on the rollers $d\ d'$, as shown in Fig. 1, in which position its upper section moves close to the open bottom of the hopper. Ordinarily the grain in the hopper will of its weight depress the belt at the portion below the open bottom, and the degree of this depression will be comparative with the amount of the grain in the hopper, causing an unequal flow of grain with the varied quantities of grain in the said hopper. To remedy this I provide the board $k$, passed within the apron and supported close up against the under side of the upper section at a point directly under or opposite the open bottom of the hopper. By this means the belt is supported at the point where most needed, and an equable discharge is secured.

In Fig. 4 I have shown the apron provided with cross-slats $J$, which I prefer to use in the operation of the machine.

On the end of one of the rollers $d\ d'$, preferably $d$, I secure a plain-faced cone-pulley, $a$. A suitable drive-shaft, $a'$, is arranged parallel to roller $d$, and is provided with a cone-pulley, $a^2$, similar to pulley $a$. This cone-pulley $a^2$ is arranged in line with pulley $a$, and in opposite directions thereto, as shown, with its smaller end in line with the larger end of the said pulley $a$. A belt, $b$, is passed around pulleys $a\ a^2$, as shown. The belt $b$ may, it will be understood, be shifted by hand; but I prefer to employ the shifting device shown in Fig. 1, and composed of the boxing $c'$, having an angular opening to receive the bar $c^2$, the screw $c^3$, and the shifter-roller $c$. This roller $c$ is provided with end flanges, $c^4$, and is arranged close to belt $b$, with said end flanges extending on opposite sides of same, as shown. It is journaled in the forward end of boxing $c'$. This boxing has an angular opening to receive the bar $c^2$, projected from the framing and supporting said boxing, so as to permit its adjustment back and forth parallel with the cone-pulleys, as shown. It is secured at any point desired by the clamping-screw $c^3$, passed through the boxing and bearing against the bar $c^2$, as shown in Fig. 1. By this means it will be seen the belt $b$ may be adjusted back and forth on the cone-pulleys and held at any desired point to regulate the speed of the feed-apron, and consequently the flow of grain to the sieves.

The operation of my invention is simple, and will be readily understood from the description before given.

Having thus described my invention, what I claim, and desire to secure by Letters Patent, is—

1. In a grain-feed for separating-machines, the combination, substantially as hereinbefore set forth, of the hopper having suitable bottom discharge-opening, the rollers arranged in front and rear of said hopper, the apron passed around said rollers and moving flush with the under side of the hopper, the cone-pulley secured on one of said rollers, a suitable drive-shaft arranged parallel with said rollers, a cone-pulley secured on said drive-shaft in line with and arranged opposite to the pulley on the roller, and the drive-belt passed around said cones, all substantially as described and shown, and for the purposes specified.

2. In a grain-feed for separating-machines, the combination of the hopper, the rollers, the feed-apron, the cone-pulleys, the drive-belt, and the shifting mechanism composed of a roller-shifter bearing against the driving-belt, and provided with end flanges projected on opposite sides of said belt, and the boxing supporting said roller-shifter, and means for adjusting the shifting mechanism laterally, substantially as described, whereby the feed is regulated, substantially as set forth.

3. The combination, in a grain-feed for separating-machines, of the hopper $f$, having open bottom and discharge-opening $g$, the rollers $d$ $d'$, arranged the one in advance and the other in rear of the hopper, the apron passed around said rollers and close against the bottom of the hopper, the supporting-board arranged close under the upper section of the apron and directly below or opposite the open bottom of the hopper, the cone-pulley $a$, secured on roller $d$, the drive-shaft, the cone-pulley $a^2$, secured thereon, the drive-belt $b$, and the shifting device $c$ $c'$ $c^2$ $c^3$, all substantially as described and shown, and for the purposes specified.

JOHN LUCAS.

Witnesses:
D. T. CHAMBERLAIN,
W. C. ASPER.